Patented Feb. 16, 1943

2,311,126

UNITED STATES PATENT OFFICE 2,311,126

FLUX FOR MAGNESIUM AND MAGNESIUM ALLOYS

Percival Robert Charles Pyle, Warmley, near Bristol, and Nelson Conroy Sheppard, Fishponds, Bristol, England, assignors to Magnal Products Limited, Warmley, near Bristol, England No Drawing. Application December 23, 1941, Serial No. 424,194. In Great Britain February 6, 1941

5 Claims. (Cl. 75—67)

This invention relates to the manufacture of fluxes adapted for use in the melting, refining and casting of magnesium and alloys rich in magnesium.

It is well known in melting, refining and casting of magnesium and alloys rich in magnesium to employ fluxes containing considerable proportions of magnesium chloride, and the object of the invention is to provide a method of manufacturing magnesium chloride in admixture with other substances which are tolerable or advantageous constituents of fluxes for melting magnesium and alloys rich in magnesium.

The invention consists broadly in preparing an intimate mixture of ammonium chloride and a chloride of an alkali metal or alkaline earth metal, or mixtures thereof, and a basic compound of magnesium, for instance by ball milling the constituents together and subjecting the mixture to heat treatment whereby progressive fusion of the mass results at a temperature below the melting point of the alkali metal or alkaline earth metal chloride itself and maintaining the mixture at about the fusion temperature until all the ammonia has been driven off.

Normally, in accordance with the invention, magnesium oxide or magnesium hydroxide is employed as the basic compound of magnesium.

Preferably, in accordance with the invention, the chlorides present in the composition are so proportioned that the mixture fuses at a temperature not exceeding 600° C. and for instance at temperatures within the range 450° C. to 550° C. since mixtures melting above these temperatures lose ammonium chloride so rapidly by volatilisation that the conversion of the magnesium oxide or other basic compound of magnesium mainly to magnesium chloride may not be complete before substantially all the ammonium chloride has been lost.

It will thus be seen that it is an important or even a characteristic feature of the invention that the salts employed and the intimacy of their admixture should be such that the essential reactions, which give rise to mixtures melting substantially below the melting points of their separate ingredients, are initiated, probably by a sintering process, or by the action of the vapours arising from the ammonium chloride, below the temperatures of fusion of any of the separate ingredients.

The following particulars are given, by way of example, of a convenient manner of carrying the invention into effect:

A mixture of 107 parts ammonium chloride, 24 parts sodium chloride and 40 parts magnesium oxide are ground together in a ball mill. The mixture is then fused and maintained in the fused state at temperatures varying from 420° C. to 550° C. When ammonia ceases to be evolved, the mass is cooled. On analysis a mixture so prepared has been found to have the following composition:

|  | Per cent |
|---|---|
| Magnesium chloride | 74.0 |
| Sodium chloride | 17.4 |
| Magnesium oxychloride | 6.8 |
| Impurities | 1.0 |

Products prepared in accordance with the invention may be used in the production of fluxes for use in the melting, refining and casting of magnesium or magnesium rich alloys by the addition of further constituents. Composition of two typical fluxes are:

|  | Per cent |
|---|---|
| Mixture prepared as in example | 42 |
| Sodium chloride | 26 |
| Magnesium fluoride | 32 | and:

|  | |
|---|---|
| Mixture prepared as in example | 67 |
| Potassium chloride | 33 |

The magnesium oxide used may be conveniently prepared from a commercial magnesium oxide sludge which in fact, consists of a suspension in water of magnesium hydrate and impurities of which those objectionable for the purposes of this invention are mainly silica and iron compounds.

To eliminate objectionable impurities the commercial magnesium oxide sludge is treated with sodium peroxide to oxidize iron compounds contained therein to the ferric state, after which ammonium chloride and ammonia are added to cause the solution of the magnesium hydrate and the precipitation and/or non-solution of the ferric compounds and of the silica.

These are removed by any suitable means such as filtration and the liquid evaporated to dryness, the residue comprising a mixture of magnesium oxide and hydrate with some ammonium chloride and traces of sodium chloride. In using the material prepared in this way it is mixed with suitable proportions of ammonium chloride and alkali metal or alkaline earth metal chlorides and fused, as above described.

In the appended claims the expression "chloride of an alkaline base" is used as meaning a chloride of an alkali metal or an alkaline earth metal or a mixture of chloride of alkaline metals and alkaline earth metals.

We claim:
1. The process of producing fluxes adapted for use in the melting, refining and casting of magnesium and alloys rich in magnesium, which comprises preparing an intimate mixture of ammonium chloride, a chloride of an alkaline base, and a basic compound of magnesium, and subjecting the mixture to heat treatment whereby progressive fusion of the mass results at a temperature below the melting point of the chloride of the alkaline base itself and maintaining the mixture at about the fusion temperature until all the ammonia has been driven off.

2. A process as claimed in claim 1 in which magnesium oxide is employed as the basic compound of magnesium.

3. A process as claimed in claim 1 in which the chlorides present in the composition are so proportioned that the mixture fuses at a temperature not exceeding 600° C.

4. A process as claimed in claim 1 in which the chlorides present in the composition are so proportioned that the mixture fuses at a temperature within the range 450° C. to 550° C.

5. The process of producing fluxes adapted for use in the melting, refining and casting of magnesium and alloys rich in magnesium, which comprises preparing an intimate mixture of ammonium chloride, a chloride of an alkali metal base and a basic compound of magnesium, and subjecting the mixture to heat treatment whereby progressive fusion of the mass results at a temperature below the melting point of the chloride of the alkali metal itself and maintaining the mixture at about the fusion temperature until all the ammonia has been driven off.

PERCIVAL ROBERT CHARLES PYLE.
NELSON CONROY SHEPPARD.